(12) United States Patent
Maung et al.

(10) Patent No.: US 9,710,411 B2
(45) Date of Patent: Jul. 18, 2017

(54) SIGNAL CONDITIONER

(71) Applicant: TEXAS INSTRUMENTS INCORPORATED, Dallas, TX (US)

(72) Inventors: Win Naing Maung, Plano, TX (US); Yonghui Tang, Plano, TX (US); Suzanne Mary Vining, Plano, TX (US); Hao Liu, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 579 days.

(21) Appl. No.: 13/963,264

(22) Filed: Aug. 9, 2013

(65) Prior Publication Data

US 2014/0207984 A1 Jul. 24, 2014

Related U.S. Application Data

(60) Provisional application No. 61/756,362, filed on Jan. 24, 2013.

(51) Int. Cl.
*G06F 13/42* (2006.01)
*G06F 13/38* (2006.01)

(52) U.S. Cl.
CPC .................................. *G06F 13/385* (2013.01)

(58) Field of Classification Search
CPC ........... G06F 12/00; G06F 12/33; G06F 13/38
USPC .................... 710/105, 110, 107, 305–306
See application file for complete search history.

(56) References Cited

U.S. PATENT DOCUMENTS

| | | | |
|---|---|---|---|
| 7,418,524 B2 | 8/2008 | Beasley et al. | |
| 7,805,559 B1 | 9/2010 | Stumpf et al. | |
| 8,185,682 B2 | 5/2012 | Bandholz et al. | |
| 2006/0026333 A1 | 2/2006 | Parr et al. | |
| 2011/0093634 A1 | 4/2011 | Minami | |
| 2011/0221521 A1* | 9/2011 | Razzell | H03F 3/45 330/69 |
| 2012/0311359 A1 | 12/2012 | Jaramillo | |
| 2012/0317446 A1* | 12/2012 | Jaramillo | G06F 11/07 714/43 |

FOREIGN PATENT DOCUMENTS

WO WO2011124049 10/2011

* cited by examiner

*Primary Examiner* — Tim T Vo
*Assistant Examiner* — Kim T. Huynh
(74) *Attorney, Agent, or Firm* — Gregory J. Albin; Charles A. Brill; Frank D. Cimino

(57) ABSTRACT

A signal conditioner can include a state machine configured to detect a predetermined protocol level mode of a data signal on a bi-directional serial bus. The signal conditioner can also include a re-driver configured to inject current into at least one of a rising edge and a falling edge of the data signal on the bi-directional serial bus in response to the detection of the predetermined protocol level mode.

18 Claims, 5 Drawing Sheets

SIGNAL CONDITIONER

RELATED APPLICATIONS

This application claims priority to U.S. Provisional Application No. 61/756,362 filed on 24 Jan. 2013, the entirety of which is incorporated herein by reference.

TECHNICAL FIELD

This disclosure relates to a signal conditioner. More particularly, this disclosure relates to a signal conditioner that includes a state machine and a re-driver.

BACKGROUND

In telecommunications and computer science, serial communication is the process of sending data one bit at a time, sequentially, over a communication channel or computer bus. Serial buses are common for short distance or long-haul communications.

Universal Serial Bus (USB) is an industry standard employed to standardize the connection of computer peripherals (including keyboards, pointing devices, digital cameras, printers, portable media players, disk drives and network adapters) to personal computers for communication and/or supplying of electrical power. Due to the versatility of USB ports, other devices, such as smart phones, personal digital assistants (PDAs) and video game consoles also employ USB.

SUMMARY

In one example, a signal conditioner can include a state machine configured to detect a predetermined protocol level mode of a data signal on a bi-directional serial bus. The signal conditioner can also include a re-driver configured to inject current into at least one of a rising edge and a falling edge of the data signal on the bi-directional serial bus in response to the detection of the predetermined protocol level mode.

In another example, a system can include a given USB device that communicates with another USB device via a USB channel. The system can also include a signal conditioner that includes a state machine configured to detect a predetermined protocol level mode of a data signal propagated on the USB channel. The signal conditioner can also include a re-driver configured to inject current into at least one of a rising edge and a falling edge of the data signal on the USB channel in response to the detection of the predetermined protocol level mode.

In yet another example, a method can include detecting, by a state machine, a predetermined protocol level mode of a data signal propagated across a USB. The method can also include injecting, by a re-driver, a positive current into the data signal in response to detecting a rising edge of the data signal that has a rise time greater than a predetermined maximum rise time. The method can further include injecting, by the re-driver, a negative current into the data signal in response to detecting a falling edge of the data signal that has a fall time greater than a predetermined maximum fall time.

DETAILED DESCRIPTION

This disclosure relates to a system that can include a given universal serial bus (USB) device that communicates with another USB device via a USB channel (e.g., data communicated via over a USB bus). The system can include a signal conditioner comprising a state machine configured to detect a predetermined protocol level mode of a data signal propagated on the USB channel, such as the High-Speed USB protocol. The signal conditioner can also include a re-driver configured to inject current into a rising edge and/or a falling edge of the data signal on the USB channel in response to the detection of the predetermined protocol level mode. In this manner, the system can boost the data signal and thereby increase the maximum physical distance between the given and the other USB device without inducing delay and/or unwanted noise, in contrast to a USB repeater and/or hub. The system can also boost the data signal, such that the data signal overcomes losses thereby ensuring the resulting boosted data signal complies with USB specifications. Without such a boosting of the data signal, in many instances, the data signal would fail to comply with USB specifications.

Figure 1:
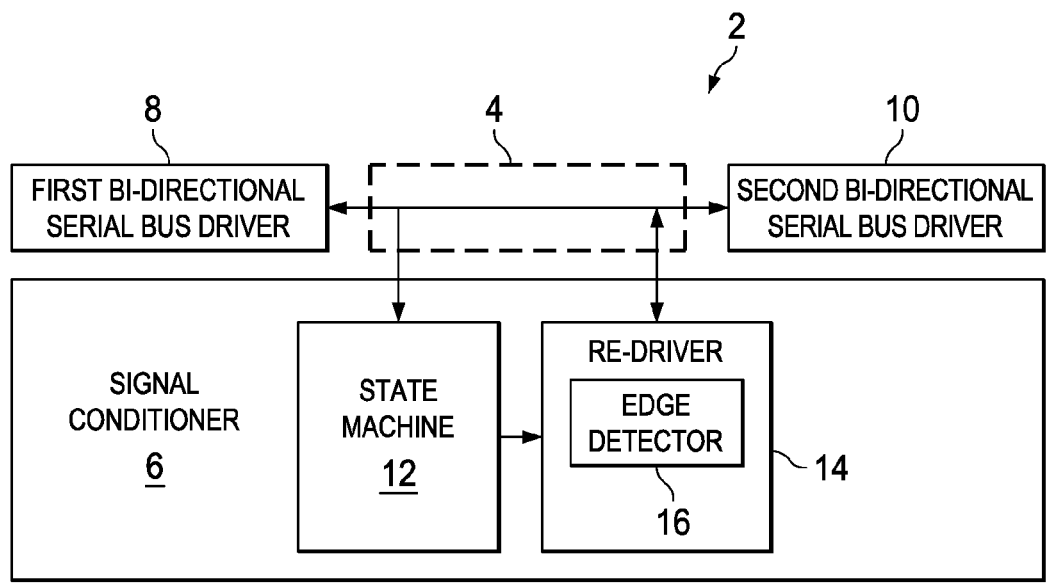
FIG. 1 illustrates an example of a system that includes a bi-directional serial communication channel coupled to a signal conditioner.

FIG. 1 illustrates an example of a system 2 with a bi-directional serial communication channel 4 coupled to a signal conditioner 6. The bi-directional serial communication channel 4 could be implemented, for example, as a USB channel, but other serial communication channels could alternately be employed.

To implement the bi-directional serial communication channel 4, a first bi-directional serial bus driver 8 can communicate with a second bi-directional serial bus driver 10. The first bi-directional serial bus driver 8 and the second bi-directional serial bus driver 10 can each be implemented, for example, as a USB port. For purposes of simplification of explanation, examples explained herein presume that the first bi-directional serial bus driver 8 and the second bi-directional serial bus driver 10 are USB ports. In such a situation, the first and second bi-directional serial bus drivers 8 and 10 can communicate in one of a plurality of different protocol level modes. For instance, the first and second bi-directional serial bus drivers 8 and 10 can communicate with a standard USB connection such as a connection at "Low Speed" (defined by the USB 1.0 standard) at data rates up to 1.5 megabits per second (Mb/s), "Full Speed" (defined by the USB 1.0 standard) at data rates up to 12 Mb/s, "High-Speed" (defined by the USB 2.0 standard) at data rates up to 480 Mb/s or the High-Speed component of a "SuperSpeed" connection (defined by the USB 3.0 standard) at data rates up to 5 Gigabits per second (Gb/s). In such a situation, SuperSpeed signaling operates in parallel over signal lines that are separate from the High-Speed component of the SuperSpeed connection. Additionally or alternatively, the first bi-directional serial bus driver 8 and the second bi-directional serial bus driver 10 can communicate through a standard such as "USB On-The-Go" or "Battery Charging".

The signal conditioner 6 can be coupled to the bi-directional serial communication channel 4 at or near an endpoint (e.g., a USB port) of the bi-directional serial communication channel 4 or anywhere in between the first bi-directional serial bus driver 8 and the second bi-directional serial bus driver 10 (e.g., a midpoint of a cable).

The signal conditioner 6 can include a state machine 12 that can detect a protocol level mode employed in the bi-directional serial communication channel 4. As used herein, the term "protocol level mode" can indicate a communication protocol and a data speed, such as the aforementioned Low Speed, Full Speed, High-Speed, Super-Speed, USB On-The-Go or Battery Charging protocol level modes. The state machine 12 can be implemented, for example, as a hardware device, a firmware device, or a combination thereof. For instance, in some examples, the state machine 12 can be implemented as a printed circuit, application-specific integrated circuit (ASIC) chip, a field programmable gate array (FPGA), or the like. In other examples, the state machine 12 can be implemented with firmware such as a microcontroller with machine readable instructions programmed in a non-transitory computer readable memory.

The state machine 12 can be programmed to activate a re-driver 14 of the signal conditioner 6 in response to detecting a predetermined protocol level mode of a signal propagating between the first bi-directional serial bus driver 8 and the second bi-directional serial bus driver 10, which signal can be referred to as a data signal. The data signal can characterize a plurality of packets that encapsulate data, which are transmitted between the first bi-directional serial bus driver 8 and the second bi-directional serial bus driver 10. In some examples, the predetermined protocol level mode could be the Full Speed or High-Speed modes. In other examples, such as situations where the bi-directional serial communication channel 4 does not comply with the USB standards, the predetermined protocol level mode could be different. The state machine 12 can detect the predetermined protocol level mode by analyzing waveforms of the data signal, such that the state machine 12 does not need to analyze the data of packets transmitted on the bi-directional serial communication channel 4.

The re-driver 14 can be implemented as a current injector. Moreover, the re-driver 14 can be implemented, for example, as hardware, firmware or a combination thereof. The re-driver 14 can be configured to inject current into the data signal. To inject the current, the re-driver 14 can include an edge detector 16 that can detect a rising edge or a falling edge of the data signal. The re-driver 14 can inject current into a rising and/or a falling edge in response to the edge detector detecting a rise or fall time greater than a predetermined maximum rise time (e.g., about 100 picoseconds) and a predetermined maximum fall time (e.g., about 100 picoseconds), respectively. Such an injection can shorten the rise and/or fall time of the data signal. The re-driver 14 can operate as a signal shaping component, such that the data within packets transmitted via the bi-directional serial communication channel 4 does not need to be analyzed.

The system 2 can be implemented such that the state machine 12 only activates the re-driver 14 in response to detecting the predetermined protocol level mode at the bi-directional serial communication channel 4. Accordingly, the re-driver 14 does not interfere with low-speed communications (e.g., Low Speed, Full Speed, Battery Charging or the like). For example, during such low-speed communications, the state machine 12 can disable the re-driver 14.

As explained herein, the state machine 12 can employ several single ended and/or a differential signal comparators (e.g., an analog front end) on data lines of the bi-directional serial communication channel 4 (e.g., the D+ and D− lines of a USB connection) to compare the data signal on the data lines to predetermined voltage levels to determine which protocol level mode is being employed on the bi-directional communication channel 4. Such a determination can be employed to enable or disable the re-driver 14. Additionally, the edge detector 16 can monitor the data signal on the data lines to determine if positive current injection is needed at a rising edge of the data signal and to determine if negative current is needed at a falling edge of the data signal. In many situations, as the current injection continues, the rising and falling times of the data signal are decreased, such that injection of negative and/or positive current (e.g., boosting) into the data signal would no longer be needed.

Employment of the system 2 can increase a maximum physical distance between the first bi-directional serial bus driver 8 and the second bi-directional serial bus driver 10. For instance, in many conventional USB 2.0 connections, USB ports must be separated by a distance of no more than 5 meters, and in fact USB 3.0 ports must be separated by a distance of no more than 3 meters. Moreover, a maximum of 5 USB repeaters and/or hubs can be included to extend the distance of a conventional USB connection. By employment of this system 2, the distance between the first bi-directional serial bus driver 8 and the second bi-directional serial bus driver 10 can be up to about 10 meters. Further, since the signal conditioner 6 operates as a signal shaping component, the signal conditioner 6 does not need to analyze data of packets communicated on the bi-directional serial communication channel 4. Accordingly, there is no theoretical limit to the number of signal conditioners 6 that can be inserted between the first bi-directional serial bus driver 8 and the second bi-directional serial bus driver 10. Thus, by inserting multiple signal conditioners 6 in between the first bi-directional serial bus driver 8 and the second bi-directional serial bus driver 10 a distance even greater than 10 meters can be achieved. In fact, there is no theoretical limit to the maximum distance between the first bi-directional serial bus driver 8 and the second bi-directional serial bus driver 10 if multiple signal conditioners 6 are inserted in between the first bi-directional serial bus driver 8 and the second bi-directional serial bus driver 10.

Additionally, the signal conditioner 6 is agnostic to the direction that the data signal is traveling. That is, the signal conditioner 6 can boost a signal propagating from the first bi-directional serial bus driver 8 to the second bi-directional serial bus driver 10 or a signal propagating from the second bi-directional serial bus driver 8 to the first bi-directional serial bus driver 10.

Figure 2:
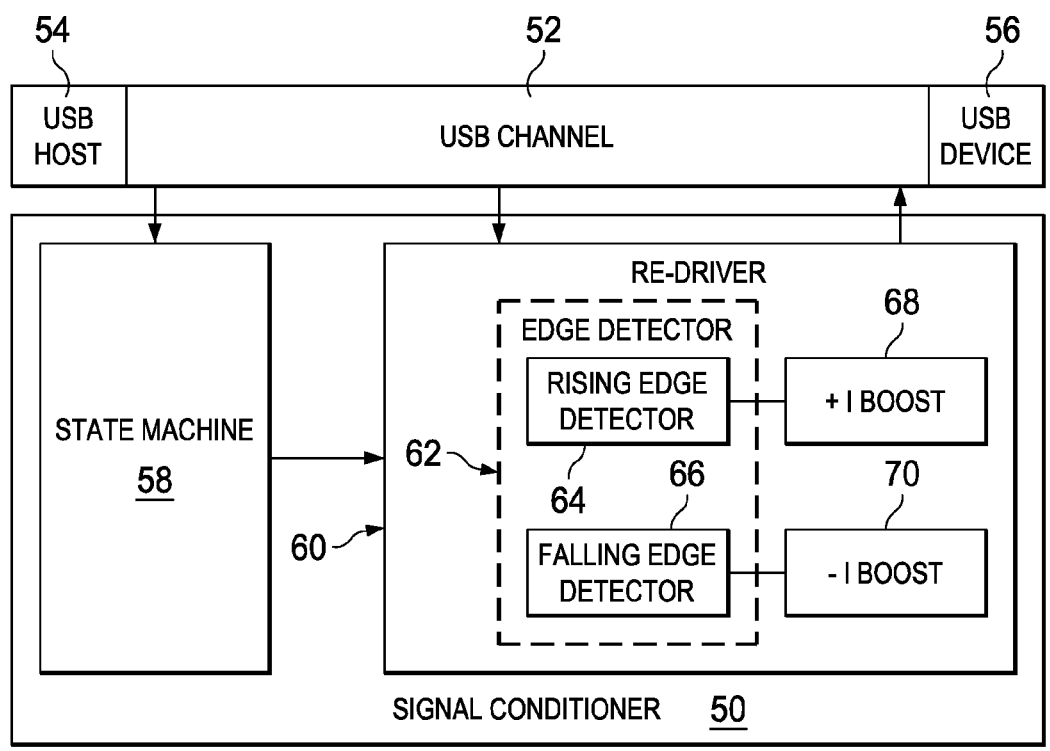
FIG. 2 illustrates an example of a signal conditioner coupled to a universal serial bus (USB) channel.

FIG. 2 illustrates an example of a signal conditioner 50 coupled to a USB channel 52. The USB channel 52 can facilitate communication between a USB host 54 and a USB device 56. The USB host 54 and the USB device 56 can include USB ports that comply with the USB 1.0, 2.0 (including USB On-The-Go) or 3.0 standards. The USB host 54 can include a USB controller and the USB device 56 can be a slave USB device. Moreover, in some examples, the USB device that is assigned the role of "host" can dynamically change, such as with the employment of the USB On-The-Go protocol level mode.

The signal conditioner 50 can be physically positioned anywhere on the USB channel 52, including at or near a USB port. Additionally, in some examples, multiple signal conditioners 50 can be positioned between the USB host 54 and the USB device 56. A signal propagating across the USB channel 52, which signal can be referred to as a data signal can be detected by a state machine 58 of the signal conditioner 50. The data signal can be a signal propagating on a twisted pair of lines, such as the D+ and D− lines of a USB port. Moreover, the data signal can be representative of multiple signals that provide packets of data between the USB host 54 and the USB device 56.

The signal conditioner 50 can include a state machine 58 and a re-driver 60, such as the state machine 12 and the re-driver 14 illustrated in FIG. 1. In some examples, the state machine 58 and the re-driver 60 can be implemented on a single integrated circuit (IC) chip. In other examples, the state machine 58 and the re-driver 60 can be implemented on separate IC chips. The state machine 58 can detect if the data signal is a predetermined protocol level mode, such as the High-Speed protocol that complies with a USB 2.0 or 3.0 standards. Upon detecting the predetermined protocol level mode, the state machine 58 can activate the re-driver 60.

The re-driver 60 can be implemented as a current injector. The re-driver 60 can receive the data signal. An edge detector 62 of the re-driver 60 can include a rising edge detector 64 that can detect a rising edge of the data signal. Additionally, the edge detector 62 can include a falling edge detector 66 that can detect a falling edge of the data signal.

The rising edge detector 64 can be configured such that if the rising edge of the data signal has a rise time of about a predetermined maximum rise time (e.g., about 100 picoseconds (ps)) or greater, the rising edge detector 64 can activate a positive current booster 68 (labeled in FIG. 2 as "+I BOOST"). The positive current booster 68 can inject a positive current into the USB channel 52 that can decrease the rise time (e.g., increase the rising rate) of rising edges of the data signal. If the data signal has a rise time less than about the predetermined maximum rise time, the positive current booster 68 may not be activated.

The falling edge detector 66 can be configured such that if the falling edge of the data signal has a falling time of about a predetermined maximum fall time (e.g. about 100 ps) or greater the falling edge detector 66 can activate a negative current booster 70 (labeled in FIG. 2 as "−I BOOST"). The negative current booster 70 can inject a negative current into the USB channel 52 that can decrease the fall time (e.g., increase the falling rate) of falling edges of the data signal. If the data signal has a fall time less than about the predetermined maximum fall time, the negative current booster 70 may not be activated.

By employment of the signal conditioner 50, USB communications between the USB host 54 and the USB device 56 can be enhanced. In particular, the physical distance between the USB host 54 and the USB device 56 can be increased to about 10 m or more. Additionally, since the state machine 58 only activates the re-driver 60 when the predetermined protocol level mode is detected, protocol level modes such as Low-Speed, Full Speed or Battery Charging are not affected by the signal conditioner 50. Furthermore, the signal conditioner 50 operates to boost a SuperSpeed signal (USB 3.0 standard) in the same manner as the High-Speed signal (USB 2.0 standard) since the data signal at the single twisted pair (the D+ and D− lines) is the same for both High-Speed and SuperSpeed. Further still, the signal conditioner 50 will operate to boost the data signal if the USB host 54 and the USB device 56 operate at the High-Speed (or SuperSpeed) protocol level mode with USB On-The-Go, since signal conditioner 50 is direction agnostic.

Yet further, in some situations, the data signal may be boosted in only one direction. For instance, if the signal conditioner 50 is installed at a physical position relatively close to the USB host 54 (e.g., within the USB port), signals propagated from the USB host 54 to the USB device 56 included in the data signal may have a rise and/or fall time less than the predetermined maximum rise and/or fall time. In the same example, signals propagated from the USB device 56 to the USB host 54 could have a rise and/or fall time greater than the predetermined maximum rise and/or fall time. In such a situation, the signals of the data signal that are propagating from then USB host 54 to the USB device 56 would not have current injected therein. Moreover the signals of the data signal are propagating from the USB device 56 to the USB host 54 would have current injected therein.

Figure 3:
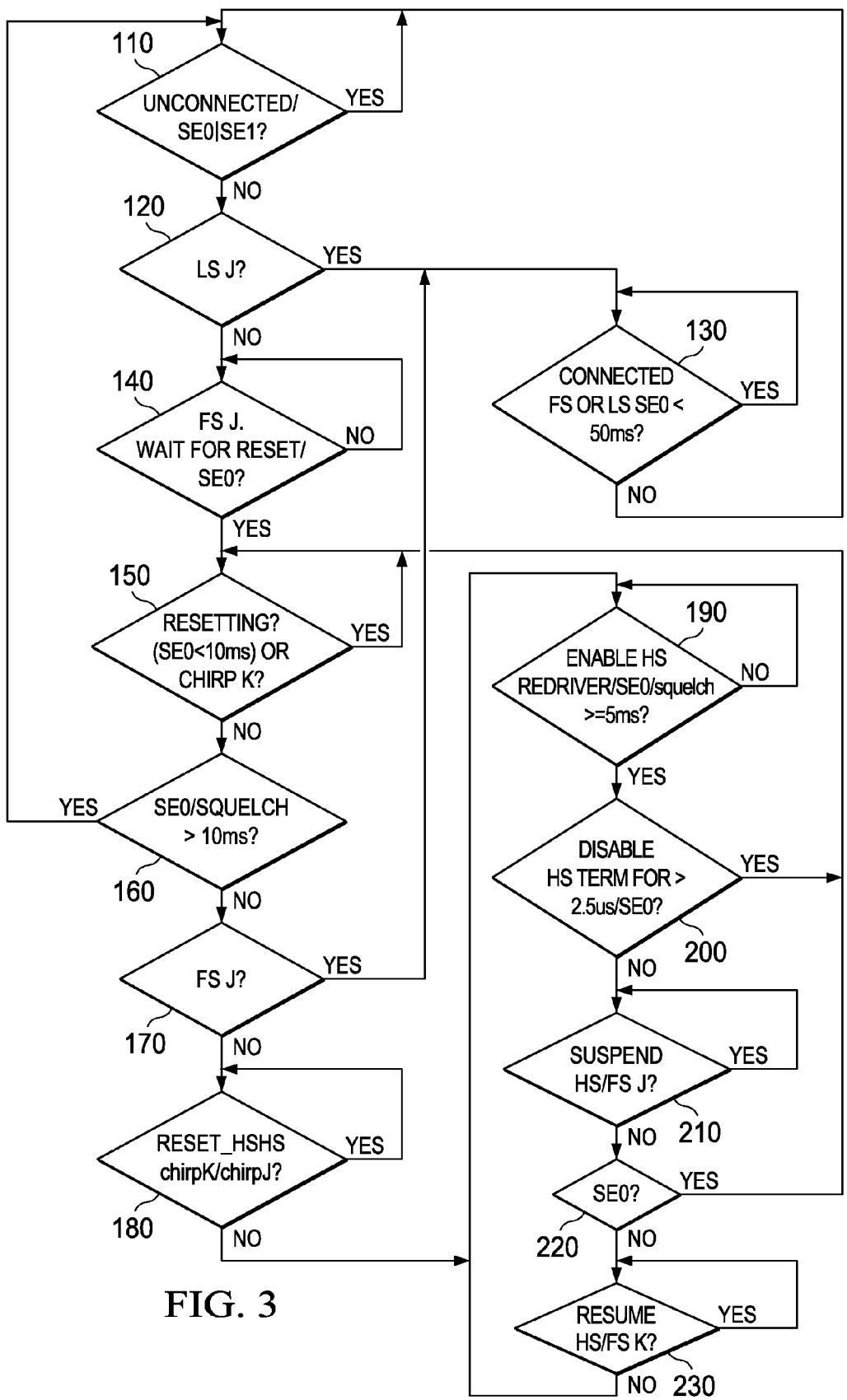
FIG. 3 illustrates an example of a flow chart of a method for detecting a protocol level mode of a USB channel.
Figure 8:
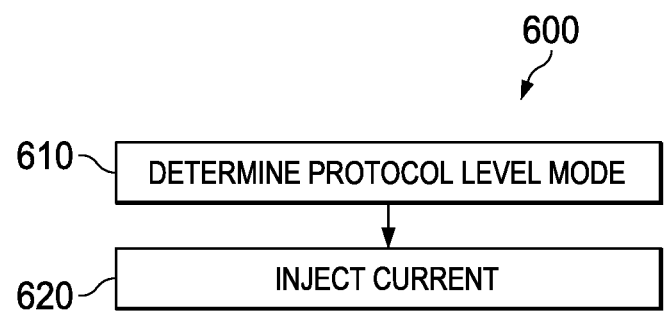
FIG. 8 illustrates an example of a method for injecting current into a data signal.

In view of the foregoing structural and functional features described above, example methods will be better appreciated with reference to FIGS. 3 and 8. While, for purposes of simplicity of explanation, the example methods of FIGS. 3 and 8 are shown and described as executing serially, it is to be understood and appreciated that the present examples are not limited by the illustrated order, as some actions could in other examples occur in different orders and/or concurrently from that shown and described herein. Moreover, it is not necessary that all described actions be performed to implement a method. The example methods of FIGS. 3 and 8 can be implemented as instructions stored in a non-transitory machine-readable medium. The instructions can be accessed by a processing resource (e.g., a processor core and/or a microcontroller) and executed to perform the methods disclosed herein.

FIG. 3 illustrates an example of a flowchart of a method 100 for detecting a protocol employed in a data signal over a serial communication channel, such as the bi-directional serial communication channel 4 illustrated in FIG. 1 and/or the USB channel 52 illustrated in FIG. 2. The method 100 could be implemented, for example, by the state machine 12 illustrated in FIG. 1 and/or the state machine 58 illustrated in FIG. 2. For purposes of simplification of explanation, in the method 100 it is presumed that the serial communication channel is a USB channel.

At 110, the USB channel can be in an unconnected state, which can indicate that no data is being transmitted from a USB host to a USB device. At 110, the state machine 110 can make a determination (e.g., a status check) as to whether a single ended zero (SE0) state or a single ended one (SE1) signal is detected on the USB channel. The SE0 signal could be indicated by the D+ and D− lines of the USB channel being in a low state (e.g., about '0' Volts) for a time of about 50 milliseconds (ms) or more. The SE1 signal could be indicated by the D+ and D− lines of the USB channel being at a high state for a time of about 50 ms or more. If the determination at 110 is positive (e.g., YES), the method 100 can return to 110. If the determination at 110 is negative (e.g., NO), the method can proceed to 120. At 120, a determination (e.g., a status check) can be made by the state machine as to whether a low-speed (LS) connection (LS J) is detected. A low-speed connection can be detected, for example, by the state machine detecting a differential '0' for a low speed link at D+ and D− lines of the USB channel for a time of about 2.5 µs or more. If the determination at 120 is positive (e.g., YES), the method 100 can proceed to 130. If the determination at 120 is negative (e.g., NO), the method 100 can proceed to 140.

At 130, the USB channel can be in a Full Speed (FS) or low-speed (LS) connection state, such that a re-driver (e.g., the re-driver 14 illustrated in FIG. 1 and/or the re-driver 60 illustrated in FIG. 2) does not need to be activated. Additionally at 130, the state machine can make determination (e.g., a status check) as to whether the state machine detects an SE0 signal for about 50 ms or less. If the determination at 130 is positive (e.g., YES), the method can return to 130. If the determination at 130 is negative (e.g., NO) (e.g., SE0 is detected for more than about 50 ms), the method 100 can return to 110.

At 140 the USB channel can be in a Full-Speed (FS) J, wait for reset condition. Additionally, at 140, a determination (e.g., a status check) by the state machine can be made as to whether an SE0 signal is detected for a time greater than or equal to about 2.5 microseconds (µs). If the determination at 140 is positive (e.g., YES), the method 100 can proceed to 150. If the determination at 140 is negative (e.g., NO), the method 100 can return to 140. At 150, the UBS channel can be in a resetting condition, and a determination (e.g., a status check) can be made by the state machine as to whether the state machine detects an SE0 signal for a time of less than about 10 ms or a chirp K signal is detected on the D− line. A chirp K signal can be a positive voltage signal on the D− line of the USB channel. If the determination 150 is positive (e.g., YES), the method 100 can return to 150. If the determination at 150 is negative (e.g., NO), the method can proceed to 160. At 160, a determination can be made by the state machine as to whether a squelch signal or an SE0 signal for a time of about 10 ms or more is detected on the USB channel. The squelch signal can be indicated by a differential signal with a difference less than about 100 microvolts (µV) on the D+ and D− lines of the USB channel. If the determination at 160 is positive (e.g., YES), the method 100 can return to 110. If the determination at 160 is negative (e.g., NO), the method 100 can proceed to 170.

At 170, a determination (e.g., a status check) can be made by the state machine as to whether a Full Speed (FS) connection (FS J) has been established. The Full Speed connection can be indicated by detecting a differential '1' at the D+ and D− of the USB channel. If the determination at 170 is positive (e.g., YES), the method 100 can proceed to 130. If the determination at 170 is negative (e.g., NO), the method can proceed to 180.

At 180, the USB channel can be in a High-Speed reset condition (Reset_HSHS). Additionally, at 180, a determination (e.g., a status check) can be made by the state machine as to whether a chirp KJ is detected by the state machine. The chirp KJ can be a High-Speed handshaking signal at the D+ and D− lines of the USB channel. The chirp KJ can be alternating K and J signals on the D+ and D− lines of the USB channel. If the determination at 180 is positive (which can indicate that a High-Speed (HS) handshake is still taking place), the method 100 can return to 180. If the determination is negative (e.g., NO), which can indicate an end of a High-Speed (HS) reset signal (e.g., High Speed (HS) idle condition at the USB channel), the method 100 can proceed to 190. The end of the High-Speed (HS) reset can be indicated by a squelch signal. At 190, the state machine can enable the re-driver, such that the data signal can be enhanced in a manner described herein. Additionally, at 190, a determination (e.g., a status check) can be made by the state machine as to whether an SE0 signal is detected on the USB channel and followed by a squelch condition on the USB channel for a time of about 5 ms or more. If the determination at 190 is negative (e.g., NO), the method 100 can return to 190. If the determination at 190 is positive (e.g., YES), the method 100 can proceed to 200.

At 200, the High-Speed (HS) condition is disabled for a term of about 2.5 µs or more. Additionally at 200, the state machine can make a determination (e.g., a status check) as to whether an SE0 signal is detected on the USB channel. If the determination at 200 is positive (e.g., YES), the method 100 can return to 150. If the determination at 200 is negative (e.g., NO), the method 100 can proceed to 210.

At 210 the USB channel can be in a High-Speed (HS) Suspend condition. Additionally, at 210, the state machine can make a determination (e.g., a status check) as to whether an FS J signal on the D+ and D− lines of the USB channel for a time of about 3 ms or more is detected. If the determination at 210 is positive (e.g. YES), the method can return to 210. If the determination at 210 is negative (e.g., NO) the method can proceed to 220. At 220, a determination (e.g., a status check) can be made by the state machine as to whether an SE0 signal is detected on the USB channel. If the determination at 220 is positive (e.g., YES), the method 100 can return to 150. If the determination at 220 is negative (e.g., NO), which can indicate that a Full-Speed (FS K) signal is detected on the USB channel, the method 100 can proceed to 230. At 230, the USB channel can be in a High-Speed resume condition. Additionally, at 230, the state machine can make a determination as to whether a Full Speed (FS K) signal is detected for a time of about 20 ms or more followed by a squelch signal. If the determination at 230 is positive (e.g., YES), the method 100 can return to 230. If the determination at 230 is negative, the method 100 can return to 190.

By employment of the method 100, the re-driver is only enabled when a High-Speed condition is detected on the USB channel. The High-Speed condition would exist for both the High-Speed protocol level mode of USB 2.0 and the SuperSpeed protocol level mode of USB 3.0. Furthermore, other protocol level modes, such as the Battery Charging, Full Speed or Low-Speed protocol level modes would not cause the re-driver to be enabled.

Figure 4:
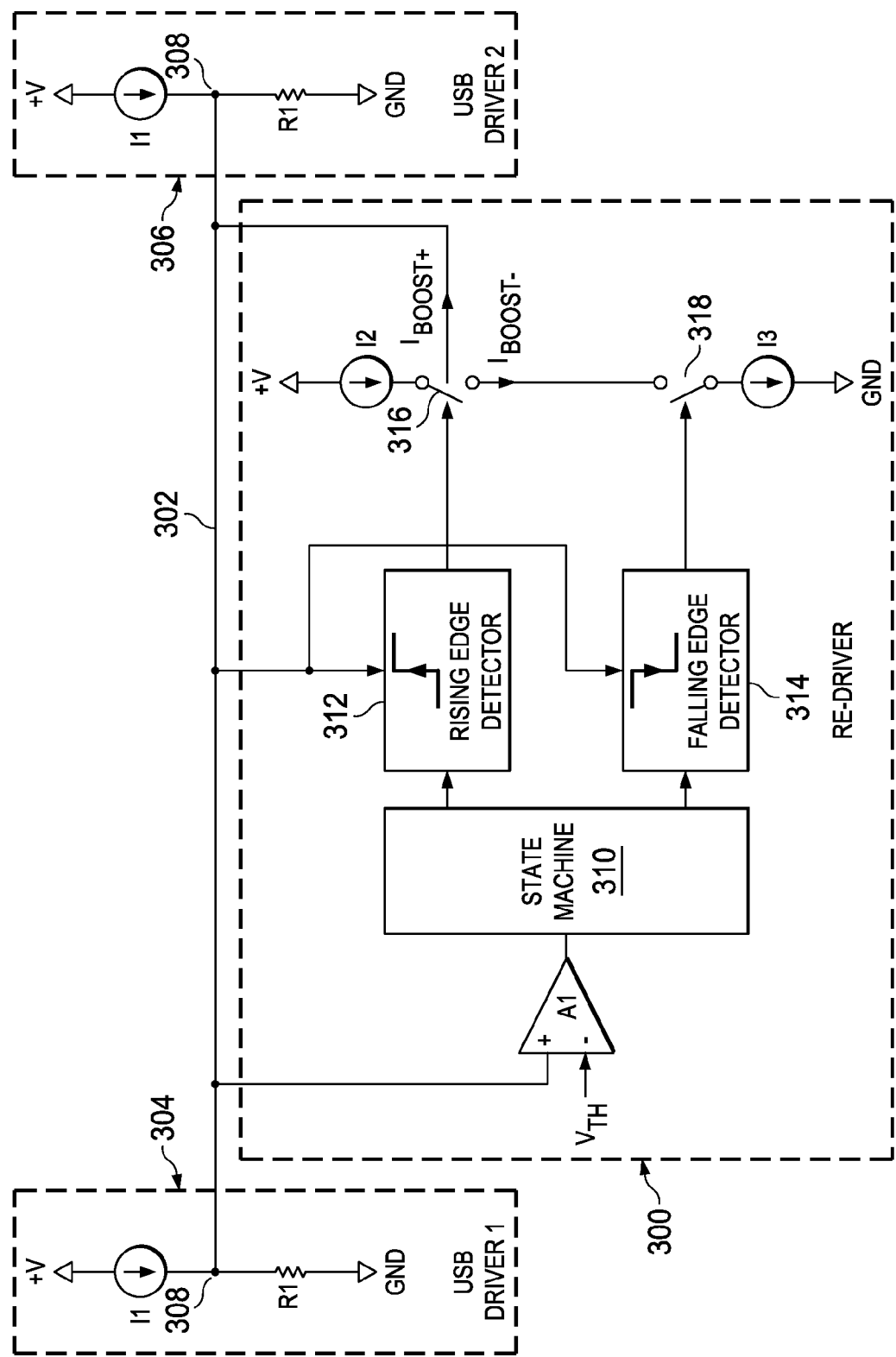
FIG. 4 illustrates an example of a circuit diagram of a re-driver.

FIG. 4 illustrates a circuit diagram of a re-driver 300 that could be employed, for example, as the re-driver 14 illustrated in FIG. 1 and/or the re-driver 60 illustrated in FIG. 2. The circuit diagram can represent the re-driver 300 applied to a data line 302. The data line 302 can be a given one of the D+ or D− line of a USB channel. Moreover, the same or similar circuit diagram can be to the other of the D+ or D− line of the USB channel.

The USB channel can include a first USB driver 304 (labeled in FIG. 4 as "USB DRIVER 1") that communicates with a second USB driver 306 (labeled in FIG. 4 as "USB DRIVER 2") via the data line 302. The first and second USB drivers 304 and 306 can be implemented, for example, as USB 2.0 or USB 3.0 drivers that can communicate with a High-Speed (or SuperSpeed) connection.

Each of the first and second USB drivers 304 and 306 can include a voltage source (labeled in FIG. 4 as "+V") that could be a voltage, for example of about 5 V. The voltage source can be coupled to a negative terminal of an independent current source (labeled in FIG. 4 as "I1") of the first and second USB drivers 304 and 306. Each independent current source can provide a relatively constant current of about 17.8 mA when a data signal is transmitted on the data line 302 in the High-Speed (or SuperSpeed) protocol. An electrically neutral node, such as ground (labeled in FIG. 4 as "GND") can be coupled to a first node of a resistor (labeled in FIG. 4 as "R 1") of each of the first and second USB drivers 304 and 306. A second node of the resistor, R1 can be coupled to an input/output (I/O) node 308. Additionally, a positive terminal of the independent current source I1 of each of the first and second USB drivers 304 and 306 can also be coupled to the I/O node 308. The data line 302 can also be coupled to the I/O node 308 at each of the first and second USB drivers 304 and 306 to establish bi-directional communication between the first and second USB drivers 304 and 306.

The re-driver 300 can include an Op Amp (labeled in FIG. 4 as "A1") that can be coupled to the data line 302 at a non-inverting input of the Op Amp A1. Additionally, the Op Amp A1 can receive a threshold voltage, $V_{TH}$ that varies based on the protocol level mode employed to communicate between the first USB driver 304 and the second USB driver 306. The threshold voltage, $V_{TH}$ can be implemented, for example, as an analog front end. An output of the OpAmp A1 can be provided to a state machine 310. The state machine 310 can be implemented, for example, in a manner similar to the state machine 12 illustrated with respect to FIG. 1 and/or the state machine 58 illustrated with respect to FIG. 2. The state machine 310 can control activation and deactivation of a rising edge detector 312 and a falling edge detector 314. The rising edge detector 312 and the falling edge detector 314 can be coupled to the data line 302.

The rising edge detector 312 can be configured to drive a control node of a first switch 316. The first switch 316 could be, for example, a normally open switch that closes in response to a signal from the rising edge detector 312. The first switch 316 could be implemented, for example, as a transistor such as a metal-oxide-semiconductor field-effect transistor (MOSFET), a bipolar junction transistor (BJT), a solid state relay, etc. An input of the first switch 316 can be coupled to a positive terminal of an independent current source, I2. A negative terminal of the independent current source, I2 can be coupled to the voltage source, V+. The current source, I2 can be a programmable current source that can vary based on a resistance of an internal resistor. In some examples, I2 can be programmed to provide a current of about 2 mA to about 6 mA. An output of the first switch 316 can be coupled to the data line 302.

The falling edge detector 314 can be configured to drive a control node of a second switch 318. The second switch 318 can be configured in a manner similar to the first switch 316. An input of the second switch 318 can be coupled to a negative terminal of an independent current source, I3. A positive terminal of the independent current source, I3 can be coupled to an electrically neutral node of about '0' V (e.g., ground). The independent current source, I3 can be a programmable current source that can vary based on a resistance of an internal resistor. In some examples, I3 can be programmed to provide a current of about 2 mA to about 6 mA. An output of the second switch 318 can be coupled to an output of the first switch 316 and to the data line 302. In some examples, the current provided by the independent current sources, I2 and I3 can be equal, and in other examples, the current provided by the independent current sources, I2 and I3 can be different.

The rising edge detector 312 can be activated by the state machine 310, such as in response to detecting a data signal provided at the High-Speed protocol level mode between the first USB driver 304 and the second USB driver 306. Upon activation, the rising edge detector 312 can cause the first switch 316 to close in response to a detected rising edge of the data signal having a rise time of about 100 ps or greater. In a similar manner, the falling edge detector 314 can be activated by the state machine 310 in response to detecting the data signal provided at the High-Speed protocol between the first USB driver 304 and the second USB driver 306. Upon activation, the falling edge detector 314 can cause the second switch 318 to close in response to a detected falling edge of the data signal having a fall time of about 100 ps or greater. Thus, up to one of the first switch 316 and the second switch 318 can be closed at a given time.

If the first switch 316 is closed and the second switch 318 is open, a positive boost current, $I_{BOOST+}$ can be provided to the data line 302. $I_{BOOST+}$ can be nearly equivalent to I2. In a similar fashion, if the second switch 318 is closed and the first switch 316 is open, a negative boost current, $I_{BOOST-}$ can be provided to the data line 302. $I_{BOOST-}$ can be nearly equivalent to I3. In this manner, the rise and/or fall times of the data signal can be decreased, thereby enhancing the data signal. Moreover, if neither the first switch 316 nor the second switch 318 is closed, such as a situation where no High-Speed protocol data signal is provided between the first USB driver 304 and the second USB driver 306, no boost current is provided.

As illustrated, the re-driver 300 is direction agnostic. Moreover, since the independent current sources I2 and I3 can be programmable, the re-driver 300 is self-limiting and can avoid overshoot. Additionally, the current sources I2 and I3 can be varied to adjust for noise that would vary, for example, based on an environment of application of the re-driver 300.

Figure 5:
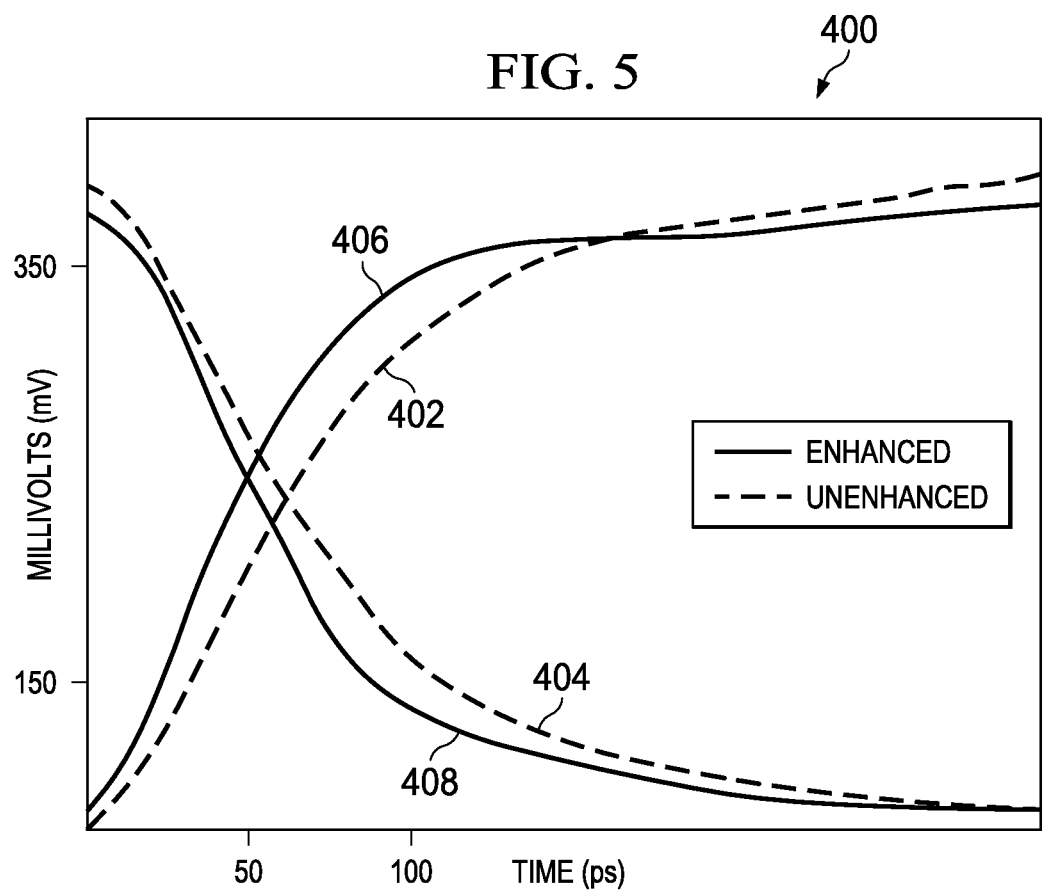
FIG. 5 illustrates an example of a graph that plots a rising edge and a falling edge of a data signal.

FIG. 5 illustrates an example of a graph 400 depicting voltage (in mV) of a rising edges and falling edges of a data signal in the High-Speed protocol level mode plotted as a function of time (in ps). The graph 400 depicts a rising edge 402 and a falling edge 404 of an example of an unenhanced data signal. The graph 400 also depicts a rising edge 406 and a falling edge 408 of an enhanced data signal. The enhanced rising and falling edges 408 and 410 can be generated, for example, by applying the unenhanced rising and falling edges 402 and 404 of the data signal to a signal conditioner, such as the signal conditioner 6 or 50 illustrated in FIG. 1 or 2. As is illustrated, the unenhanced rising and falling edges 402 and 404 have rise and fall times greater than 100 ps. Conversely, the enhanced rising and falling edges 406 and 408 of the data signal have rise and fall times less than 100 ps. Moreover, as is illustrated, the enhanced rising and falling edges 406 and 408 of the data signal avoid undesired overshoot.

Figure 6:
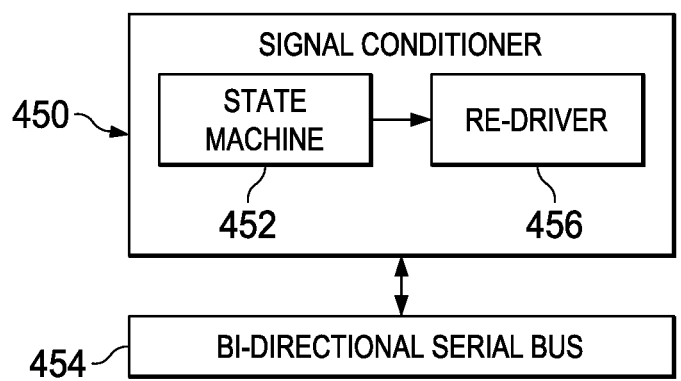
FIG. 6 illustrates another example of a bi-directional serial bus coupled to a signal conditioner.

FIG. 6 illustrates another example of a signal conditioner 450 to enhance a data signal. The signal conditioner 450 could be implemented, for example, in a manner similar to the signal conditioner 6 illustrated in FIG. 1 and/or the signal conditioner 50 illustrated in FIG. 2. The signal conditioner 450 can include a state machine 452 configured to detect a predetermined protocol level mode of a data signal on a bi-directional serial bus 454. The signal conditioner 450 can also include a re-driver 456 configured to inject current into at least one of a rising edge and a falling edge of the data signal on the bi-directional serial bus 454 in response to the detection of the predetermined protocol level mode.

Figure 7:
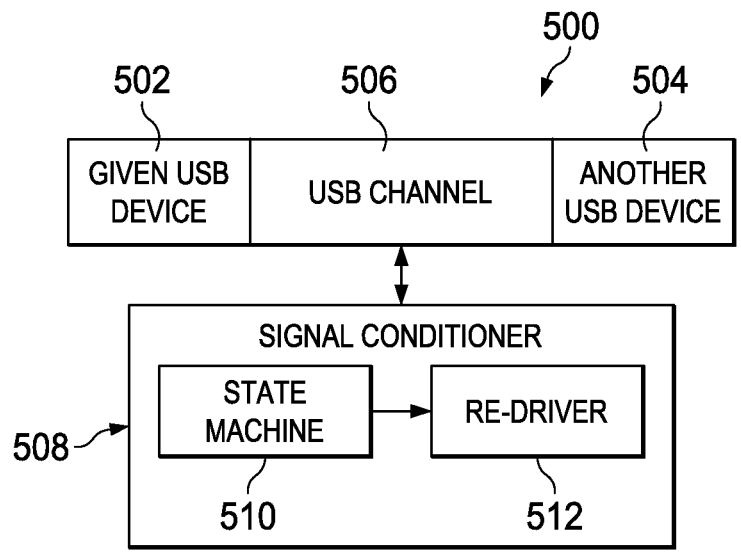
FIG. 7 illustrates an example of a system with a USB coupled to a signal conditioner.

FIG. 7 illustrates a system 500 that can include a given USB device 502 that can communicate with another USB device 504 via a USB channel 506. The system 500 can also include a signal conditioner 508 that can include a state machine 510 configured to detect a predetermined protocol level mode of a data signal propagated on the USB channel. The system 500 can further include a re-driver 512 configured to inject current into at least one of a rising edge and a falling edge of the data signal on the USB channel 506 in response to the detection of the predetermined protocol level mode.

FIG. 8 illustrates an example of a method 600 for enhancing a data signal. The method could be implemented, for example, by the signal conditioner 6 illustrated in FIG. 1 and/or the signal conditioner 50 illustrated in FIG. 2. At 610, a state machine (e.g., the state machine 12 of FIG. 1 and/or the state machine 58 of FIG. 2) of the signal conditioner can detect a predetermined protocol level mode (e.g., the High-Speed USB protocol) of a data signal propagated across a USB. At 620, a re-driver (e.g., the re-driver 14 illustrated in FIG. 1 and/or the re-driver 60 illustrated in FIG. 2) can inject a current in to the data signal. For instance, in some instances, the redriver can inject positive current into the data signal in response to detecting a rising edge of the data signal that has a rise time greater than a predetermined maximum rise time. In other instances, the re-driver can inject a negative current into the data signal in response to detecting a falling edge of the data signal that has a fall time greater than a predetermined maximum fall time. In some examples, if the predetermined protocol level mode is not detected, the injecting of the positive current and/or the negative current can be prevented by the state machine.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A signal conditioner comprising:
    a state machine configured to detect a predetermined protocol level mode of a data signal on a half duplex serial bus, the predetermined protocol level indicating a data speed; and
    a re-driver configured to inject current into at least one of a rising edge and a falling edge of the data signal on the half duplex serial bus in response to the detection of the predetermined protocol level mode indicating the data speed,
    wherein the state machine is configured to disable the re-driver in response to detecting a protocol level mode different than the predetermined protocol level mode.

2. The signal conditioner of claim 1, wherein the half duplex serial bus is a universal serial bus (USB).

3. The signal conditioner of claim 2, wherein the predetermined protocol level mode is the High-Speed USB protocol.

4. The signal conditioner of claim 3, wherein the data signal is provided on the D+ and D− lines of the USB.

5. The signal conditioner of claim 1, wherein the re-driver further comprises:
    a rising edge detector configured to detect a rising edge of the data signal that has a rise time greater than a predetermined maximum rise time; and
    a falling edge detector configured to detect a falling edge of the data signal that has a fall time greater than a predetermined maximum fall time.

6. The signal conditioner of claim 5, wherein the re-driver further comprises:
    a positive current booster configured to inject a positive current into the data signal in response to a given activation signal provided from the rising edge detector; and
    a negative current booster configured to inject a negative current into the data signal in response to another activation signal provided from the falling edge detector.

7. The signal conditioner of claim 6,
    wherein the positive current booster is further configured to not provide the given activation signal to the positive current booster in response to determining that the rising edge of the data signal has a rise time less than the predetermined maximum rise time; and
    wherein the negative current booster is further configured to not provide the another activation signal to the negative current booster in response to determining that the falling edge of the data signal has a fall time less than the predetermined maximum fall time.

8. The signal conditioner of claim 5, wherein the positive current booster comprises an independent current source with a programmable current range of about 2 milliamperes (mA) to about 6 mA.

9. The signal conditioner of claim 1, wherein the state machine is further configured to detect the predetermined protocol level mode based on waveform properties of the data signal.

10. The signal conditioner of claim 1, wherein the state machine and the re-driver are implemented on separate integrated circuit (IC) chips.

11. An integrated circuit (IC) chip comprising the signal conditioner of claim 1.

12. A system comprising:
    a universal serial bus (USB) device that communicates with another USB device via a bi-directional bus; and
    a signal conditioner comprising:
        a state machine configured to detect a predetermined protocol level mode of a data signal propagated on the bi-directional bus, the predetermined protocol level indicating a data speed; and
        a re-driver configured to inject current into at least one of a rising edge and a falling edge of the data signal on the bi-directional bus in response to the detection of the predetermined protocol level mode indicating the data speed,
        wherein the state machine is configured to disable the re-driver in response to detecting a protocol level mode different than the predetermined protocol level mode.

13. The system of claim 12, wherein the predetermined protocol level mode is a High-Speed USB protocol.

14. The system of claim 12, wherein the signal conditioner is implemented in an integrated circuit (IC) chip located within a USB port of the USB device.

15. The system of claim 12, wherein the state machine is further configured to detect the predetermined protocol level mode based on waveform properties of the data signal.

16. A method comprising:
    detecting, at a state machine, a predetermined protocol level mode of a data signal propagated across a half duplex bus;

injecting, by a re-driver, a positive current into the data signal in response to detecting a rising edge of the data signal that has a rise time greater than a predetermined maximum rise time; and injecting, by the re-driver, a negative current into the data signal in response to detecting a falling edge of the data signal that has a fall time greater than a predetermined maximum fall time.

17. The method of claim 16, further comprising preventing, by the state machine, the injecting of the positive current and the negative current in response to detecting a protocol level mode other than the predetermined protocol level mode on the bus.

18. The method of claim 17, wherein the predetermined protocol level mode is the High-Speed universal serial bus (USB) protocol.

* * * * *